(12) United States Patent
Petruchik et al.

(10) Patent No.: US 6,386,711 B1
(45) Date of Patent: May 14, 2002

(54) DIGITAL PROJECTOR WITH SCANNER

(75) Inventors: Dwight J. Petruchik, Honeoye Falls; Richard L. Alfvin, Pittsford, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/638,999

(22) Filed: Aug. 14, 2000

(51) Int. Cl.[7] .......................... G03B 21/00; G03B 21/22
(52) U.S. Cl. .......................................... 353/122; 353/71
(58) Field of Search ................................. 353/122, 71

(56) References Cited

U.S. PATENT DOCUMENTS

| | | | | |
|---|---|---|---|---|
| 5,414,481 A | * | 5/1995 | Fujioka et al. ............... | 353/122 |
| 5,428,417 A | * | 6/1995 | Lichtenstein ................. | 353/122 |
| 5,467,153 A | * | 11/1995 | Fargeot ........................ | 353/103 |
| 6,082,865 A | * | 7/2000 | Yamazaki .................... | 353/122 |
| 6,141,043 A | * | 10/2000 | Suzuki et al. ................ | 348/211 |

FOREIGN PATENT DOCUMENTS

JP        9-294236        11/1997

* cited by examiner

*Primary Examiner*—Russell Adams
*Assistant Examiner*—Magda Cruz
(74) *Attorney, Agent, or Firm*—Thomas H. Close

(57) ABSTRACT

A document projector includes a feed through scanner having a document transport, an illumination source, and a linear image sensor for scanning and producing a digital color image of a document or transparency; a microprocessor connected to the scanner for processing the digital image and for overall control of the apparatus; a memory connected to the microprocessor for storing the digital document image; and a digital projector connected to the microprocessor for projecting the digital image.

6 Claims, 3 Drawing Sheets

DIGITAL PROJECTOR WITH SCANNER

FIELD OF THE INVENTION

This invention relates to document projectors and more particularly to digital electronic projectors.

BACKGROUND OF THE INVENTION

Today many business presentations requiring visuals are made using digital projection technology. While digital projectors are very costly, the quality is reasonably good and the convenience of being able to directly present slides prepared on a computer is attractive. However, many institutions such as schools or smaller businesses cannot justify the expense of such a device because of its limited capability and flexibility (only digital data files can be projected), and rely instead on overhead transparencies to make presentations. Overhead transparency projectors are relatively inexpensive but unless they are cleaned regularly and well maintained the image quality is often not very good and the preparation of transparencies, especially those in color made from computer files, is time consuming and quite costly itself in both time and materials.

There are further limitations to these two main presentation technologies. Digital projectors are limited in that they can only project a slide existing as a digital data file, normally residing on a personal computer hard drive, and overhead projectors can only project transparencies. Also, there are often last-minute additions which must be made to presentations, e.g. updated sales reports, recently published documents or advertising material, etc., and there may not be sufficient time to either convert the material to digital data files for projection by a digital projector or to a transparency for use with an overhead projector. It would be useful therefore to have a projector which is more flexible in the type of materials which could be projected.

One potential solution which addresses some of these limitations has been disclosed in Japanese laid-open patent application JP 09-294,236. The '236 application discloses an apparatus which combines a document camera mounted in "copy stand" fashion on top of a digital projector. This device can capture a digital image of any object or document within the field of view of the camera and then subsequently project this digital image using the projector functionality. A significant limitation of this device, however, is the need to provide extra illumination for the camera. When such a projector is used in a darkened room, as is typical with digital projectors, the stray light from this illumination can detract from the quality of viewing. The overall image quality available from such a device is also impacted by the level and uniformity of this illumination, as well as by the resolution of the camera. The device is also typical of digital projectors in that it has no memory for the storage of multiple images.

These and other limitations of the prior art are addressed by the present invention.

SUMMARY OF THE INVENTION

The need is met according to the present invention by providing a document projector that includes a feed through scanner having a document transport, an illumination source, and a linear image sensor for scanning and producing a digital color image of a document or transparency; a microprocessor connected to the scanner for processing the digital image and for overall control of the apparatus; a memory connected to the microprocessor for storing the digital document image; and a digital projector connected to the microprocessor for projecting the digital image.

ADVANTAGES

The document projector of the present invention has the advantage that a high quality display can be easily produced from either transparent or opaque originals. Previously displayed images are immediately available electronically without the need to reposition the originals, and extra slides can be easily inserted into a presentation during the presentation.

DETAILED DESCRIPTION OF THE INVENTION

Figure 1:
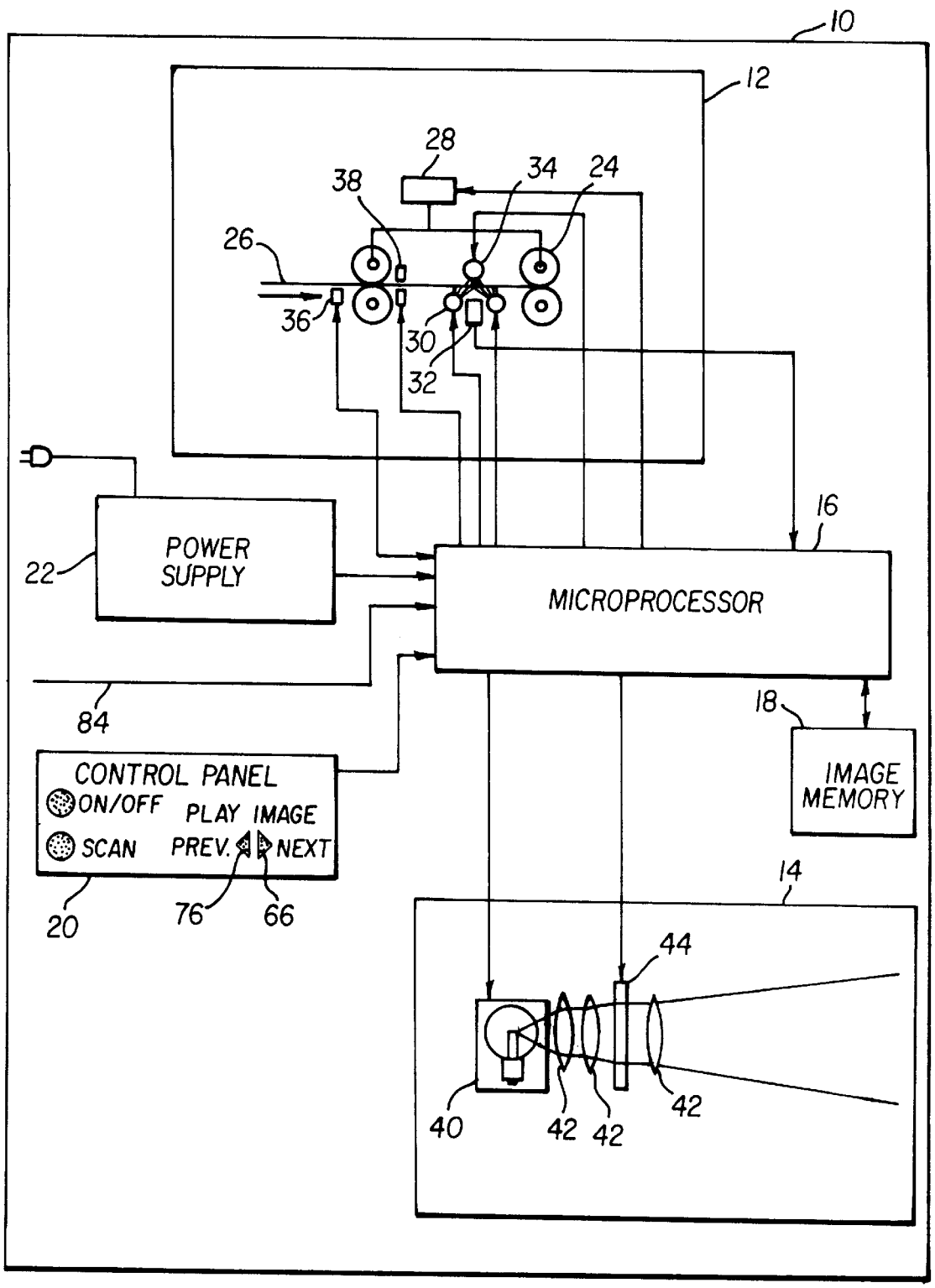
FIG. 1 is a block diagram of the components of a document projector according to the present invention.

Referring to FIG. 1, a block diagram of the components for a document projector, generally designated 10 according to the present invention is shown. The digital projector 10 includes a feed through scanner 12 and a digital projector 14, which are connected to a microprocessor 16 that provides control and digital image processing support for the document projector 10. The document projector 10 also includes an image memory 18 (typically DRAM solid state memory), control panel 20 and a power supply 22.

The feed through scanner 12 contains a document transport including a set of drive rollers 24 that transport a document 26 at a controlled rate through the scanner by a drive motor 28. The document 26 is driven past an illumination source including one or more scan lamps 30 which illuminate the document 26. An image of the document is then captured by a linear sensor 32 such as a CCD or CMOS sensor, which produces a digital image of the document 26. The feed through scanner 12 includes transparency scanning capability with transparency scan lamps 34 located opposite the linear sensor 32.

Optionally, the scanner 12 includes a sheet sensor 36 and transparency detector 38 for detecting when a transparency has been loaded into the document projector 10. Alternatively, the document projector 10 is provided with a reflection/transparency scanning mode switch. The transparency mode disables the reflection light source and employs a different set of look up tables to process the digital image in the microprocessor 16 prior to projection.

The output of the image sensor 32 is converted from an analog signal to a digital signal and is sent to the microprocessor 16. The microprocessor 16 performs color corrections on the digital image and compresses the image so it will occupy less space in image memory 18. The digital image is then stored in image memory 18.

The microprocessor 16 controls the timing of the sequence of operation of the document projector 10. The control panel 20 sends signals to the microprocessor 16 from the user. Finally the power supply 22 converts AC power to the required voltages for various components of the document projector 10.

The digital projector 14 includes a high intensity lamp 40 for projecting the digital image. Light from this lamp 40 is focused with projection optics 42 so that it projects through a Spatial Light Modulator 44, such as a liquid crystal (LCD) modulator, or a digital micro-mirror device (DMD), where the light is selectively attenuated or reflected by color and location so as to represent the document image. The Spatial Light Modulator 44 is controlled by signals generated from the microprocessor 16. The light exiting the Spatial Light Modulator 44 is then focused by projection optics 42 so as to project the image onto a screen (not shown).

Figure 2:
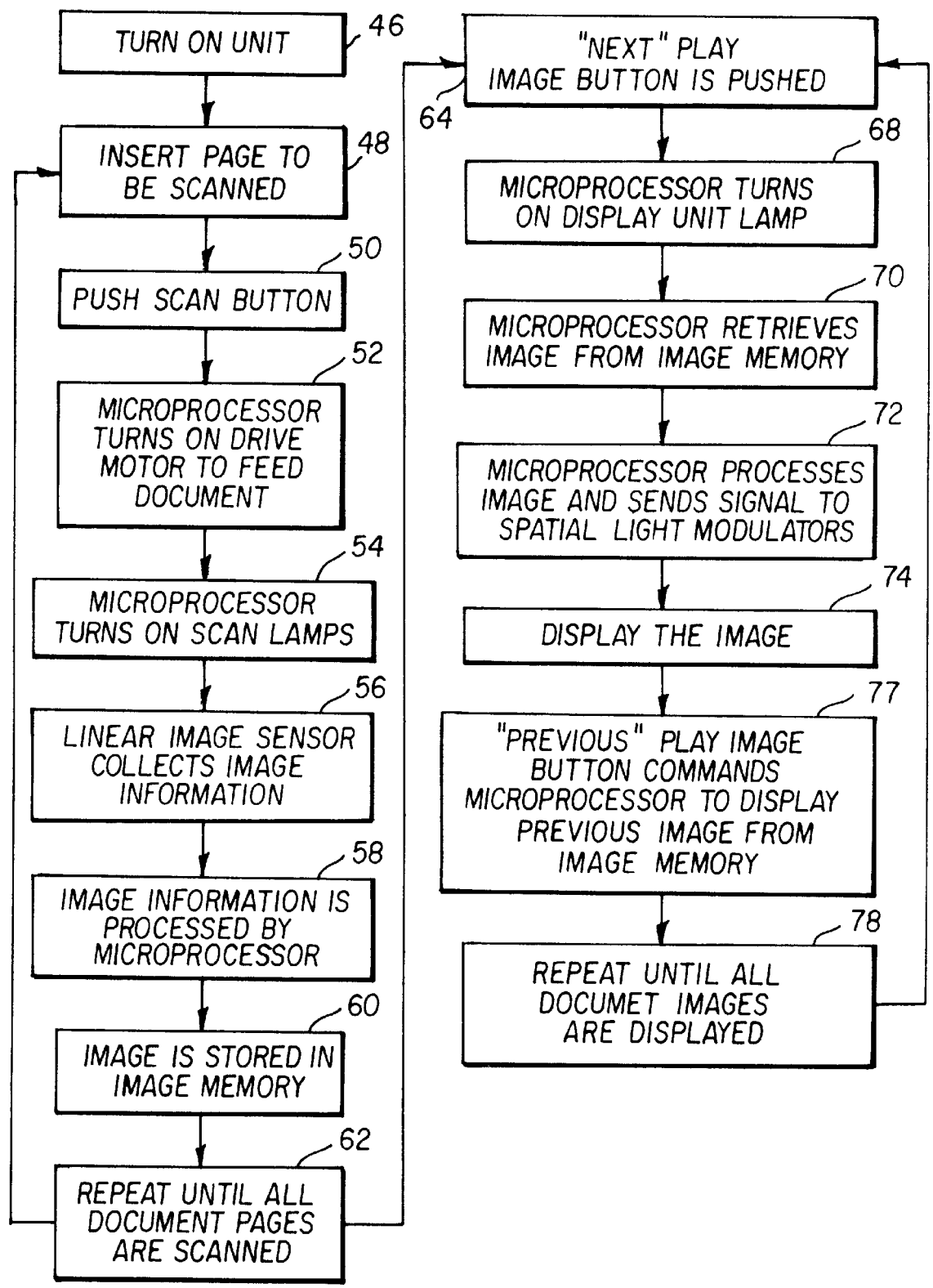
FIG. 2 is a flow chart illustrating one aspect of the operation of a particular embodiment of the present invention.

FIG. 2 is a flow chart for the operation of the document projector 10 according to the present invention, where a single or multi page document is prescanned into the image memory for display at a later time.

For the pre-scanning and displaying mode of operation a user would first turn the unit on 46. The operator would then insert 48 the first page of the document to be scanned into the scanning paper path. The user would then push 50 the scan button on the control panel. Alternatively, the signal from the document sensor 36 can be used to initiate the scan. This commands the control microprocessor to turn on the scanner unit drive motor which transports the page to the scan lamps and linear sensor 52. The control microprocessor turns on 54 the scan lamps 30 and signals the linear image sensor to collect image information 56. The image information is processed 58 by the microprocessor 16 to adjust the color correction and to compress the digital image. The compressed image is then stored 60 in the image memory 18. This sequence is repeated 62 until all pages of the document are scanned.

To display the images the user presses 64 a "Next" play image button 66 on the control panel. This commands the microprocessor to turn on 68 the display unit lamp 40. A signal is sent to the microprocessor to retrieve 70 the first image from the image memory. This image is processed and an image signal is sent 72 to the Spatial Light Modulators 44 of the display unit 14, where the light is selectively attenuated by color and location so as to represent the document image. The light exiting the Spatial Light Modulators is then focused by projection optics 42 so as to display 74 the image onto a screen. A previous play image button 76 may be actuated to command the microprocessor 16 to display the previous image 77. This is repeated 78 until all the document images are displayed.

Figure 3:
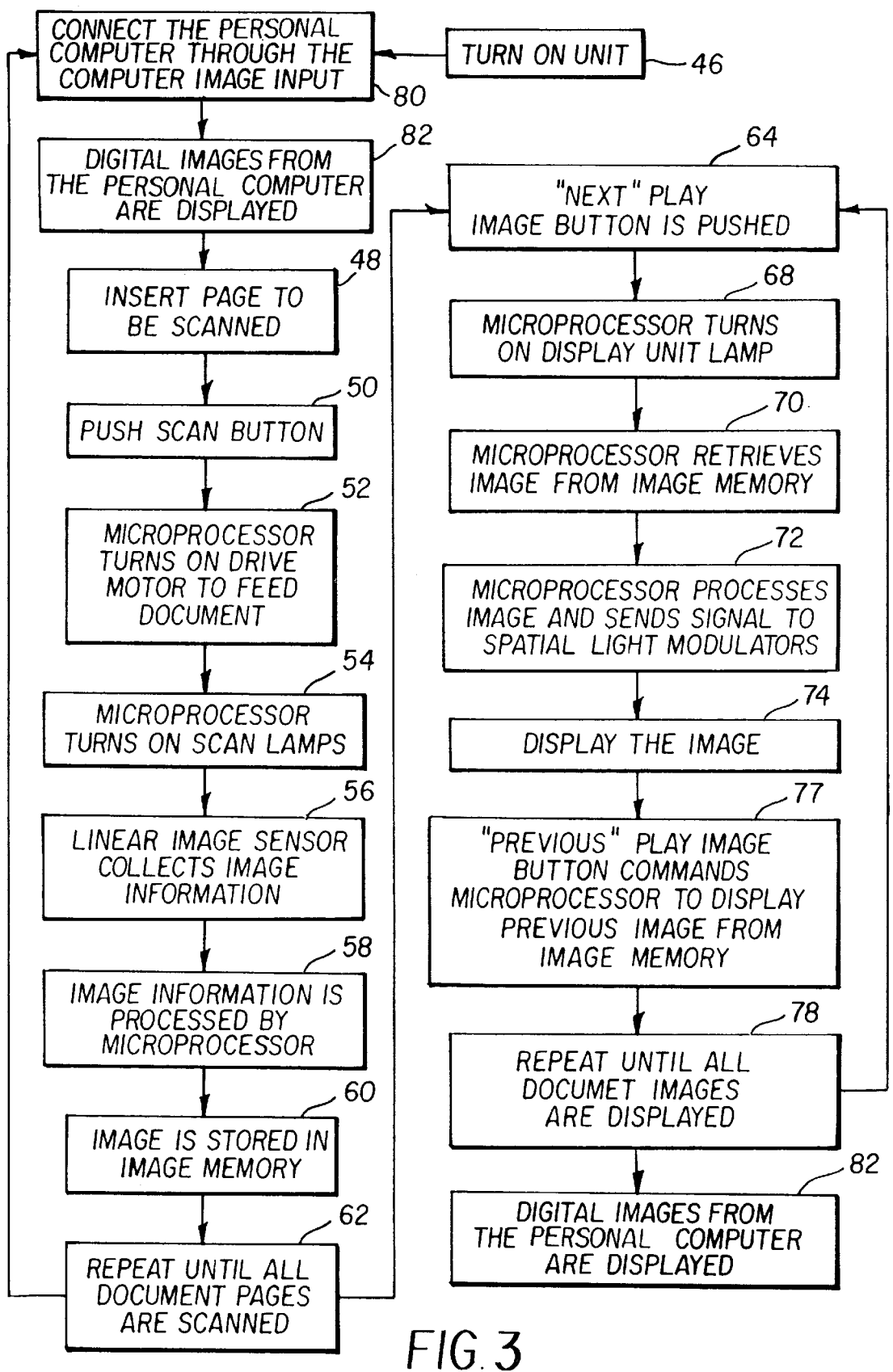
FIG. 3 is a flow chart illustrating another aspect of the operation of a particular embodiment of the present invention.

FIG. 3 is a flow chart for the operation of a document projector 10 according to the present invention where a presentation is being provided to the microprocessor 16 from a connected personal computer (not shown). During a presentation of this type the user may want to display additional or new documents that are not resident in the computer. This flow chart shows how a document 26 can be scanned and displayed in the middle of a presentation from a connected personal computer.

To add a new document to a presentation which is being provided to the microprocessor 16 from a personal computer, the user turns on the unit 46 and connects the personal computer 80 through the computer image input 84. Digital images are then provided to the microprocessor 16 from the personal computer. Digital images from the personal computer 82 are then displayed. When a new document is to be added to the presentation the user inserts 48 the first page of the document 26 to be scanned into the scanning paper path. The user would then push 50 the scan button on the control panel 20. Alternatively, the signal from the document sensor 36 can be used to initiate the scan. This commands the microprocessor to turn on the scanner unit feed motor, which transports the document to the scan lamps and linear image sensor 52. The control microprocessor turns on 54 the scan lamps 30 and signals the linear image sensor to collect image information 56. The image information is processed 58 by the microprocessor 16 to adjust the color correction and to compress the digital image. The compressed image is then stored 60 in the image memory 18. This sequence is repeated 62 until all pages of the document are scanned.

To display the images the user presses 64 a "Next" play image button 66 on the control panel. This commands the microprocessor to turn on 68 the display unit lamp 40. A signal is sent to the image microprocessor to retrieve 70 the first image from the image memory. This image is processed and an image signal is sent 72 to the Spatial Light Modulators 44 of the display unit 14, where the light is selectively attenuated by color and location so as to represent the document image. The light exiting the spatial light modulators is then focused by projection optics 42 so as to display 74 the image onto a screen. A previous play image button 76 may be actuated to command the microprocessor 16 to display the previous image 76. This is repeated 78 until all the document images are displayed. Digital images from the personal computer 82 are then displayed.

The user can switch from digital images from the personal computer 82 to scanned digital images by pressing 64 the next play image button on the control panel 20 of the document projector 10. The user can also switch from scanned digital images to digital images from the personal computer 82 by pressing the next image button on the personal computer.

The invention has been described in detail with particular reference to certain preferred embodiments thereof, but it will be understood that variations and modifications can be effected within the spirit and scope of the invention.

PARTS LIST 10 document projector
12 feed through scanner
14 digital projector
16 microprocessor
18 image memory
20 control panel
22 power supply
24 drive rollers
26 document
28 drive motor
30 scan lamps
32 linear sensor
34 transparency scan lamps
36 sheet sensor
38 transparency detector
40 lamp
42 projection optics
44 Spatial Light Modulator
46 turn on unit
48 insert page to be scanned
50 push the scan button
52 microprocessor turns on drive motor
54 microprocessor turns on scan lamps
56 linear image sensor collects image information
58 image information is processed by the microprocessor
60 image is then stored in the image memory
62 sequence is repeated until all pages of the document are scanned
64 user presses a next play image button
66 next image play button

68 microprocessor turns on the display unit lamp
70 microprocessor retrieves image from the image memory
72 image is processed and an image signal is sent to the Spatial Light Modulators
74 display the image
76 previous play image button
78 display the previous image
80 repeated until all the document images are displayed
80 connect the personal computer through the computer image input
82 digital images from the personal computer are displayed

What is claimed is:

1. A document projector, comprising:

a feed through scanner having a document transport, an illumination source, and a linear image sensor for scanning and producing a digital color image of a document or transparency;

a microprocessor connected to the image sensor for processing the digital image:

a memory connected to the microprocessor for storing the digital document image; and a digital projector connected to the microprocessor for projecting the digital image.

2. The document projector claimed in claim 1, wherein the microprocessor further comprises control means for overall control of the projector.

3. The document projector claimed in claim 1, further comprising an image input connected to the microprocessor for receiving digital image files from sources external to the apparatus.

4. The document projector claimed in claim 1 wherein the illumination source and the sensor are arranged to scan a reflection document.

5. The document projector claimed in claim 1 wherein the illumination source and the sensor are arranged to scan a transparency.

6. The document projector claimed in claim 1, further comprising a document type detector.

* * * * *